United States Patent
Kobayashi et al.

(10) Patent No.: US 10,943,078 B2
(45) Date of Patent: Mar. 9, 2021

(54) TAG IDENTIFICATION DEVICE, TAG IDENTIFICATION METHOD, AND NON-TRANSITORY COMPUTER READABLE STORAGE MEDIUM

(71) Applicant: YOKOGAWA ELECTRIC CORPORATION, Tokyo (JP)

(72) Inventors: Yasunori Kobayashi, Tokyo (JP); Sachinkumar Dattatray Sonje, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 59 days.

(21) Appl. No.: 16/262,236

(22) Filed: Jan. 30, 2019

(65) Prior Publication Data

US 2019/0243996 A1 Aug. 8, 2019

(30) Foreign Application Priority Data

Feb. 2, 2018 (JP) .............................. JP2018-017606

(51) Int. Cl.
*G06K 7/10* (2006.01)
*G05B 23/02* (2006.01)
*G06K 19/07* (2006.01)

(52) U.S. Cl.
CPC ..... *G06K 7/10366* (2013.01); *G05B 23/0272* (2013.01); *G06K 19/0723* (2013.01); *G05B 2219/24163* (2013.01)

(58) Field of Classification Search
CPC .......................... G06K 7/10366; G05B 23/0272

USPC ......................................................... 235/451
See application file for complete search history.

(56) References Cited

U.S. PATENT DOCUMENTS

| | | | |
|---|---|---|---|
| 6,505,341 B1* | 1/2003 | Harris | G05B 11/42 716/117 |
| 8,391,583 B1* | 3/2013 | Mennie | G06K 9/03 382/135 |
| 2007/0135944 A1* | 6/2007 | Schmid | G05B 23/0272 700/83 |
| 2017/0248942 A1 | 8/2017 | Sudo et al. | |

(Continued)

FOREIGN PATENT DOCUMENTS

JP 4399773 B2 1/2010

*Primary Examiner* — Michael G Lee
*Assistant Examiner* — David Tardif
(74) *Attorney, Agent, or Firm* — Osha Bergman Watanabe & Burton LLP

(57) ABSTRACT

A tag identification device automatically identifies a correspondence relationship between a tag name arbitrarily set by a user and a process value. The tag identification device includes a processor, in a first process, that obtains first definition information in which the tag name, a type of tag data which is handled using the tag name, an upper limit value, an lower limit value, and an engineering unit are defined for each tag. The processor extracts, from the first definition information, a tag coinciding with at least one of the type of tag, the upper limit value, the lower limit value, and the engineering unit of a predetermined first process value. The processor selects the tag data handled using the tag name defined for the extracted tag, using an actual measurement value of the tag data. The processor identifies the selected tag data as the first process value.

20 Claims, 7 Drawing Sheets

(56) References Cited

U.S. PATENT DOCUMENTS

2018/0046630 A1* 2/2018 Kamath .............. G06F 16/907
2019/0050414 A1* 2/2019 Maturana ............ G06F 16/164

* cited by examiner

| FCS NAME | DRAWING | TAG NAME | TAG TYPE | TAG COMMENT | UPPER LIMIT VALUE | LOWER LIMIT VALUE | ENGINEERING UNIT |
|---|---|---|---|---|---|---|---|
| FCS2101 | DR0021 | 2100FI063 | PVI | FG FRM Other Unit | 35000 | 0 | NM³/H |
| FCS2101 | DR0021 | 2100PI099 | PVI | SEA WTR SUP | 2.000 | 0.000 | barg |
| FCS2101 | DR0021 | 2100PI100 | PVI | SUSP SWR | 1.000 | 0.000 | barg |
| FCS2101 | DR0021 | 2100PI101 | PVI | SERV WTR | 4.000 | 0.000 | barg |
| FCS2101 | DR0021 | 2100PI102 | PVI | MP BFW | 39.00 | 0.00 | barg |
| FCS2101 | DR0021 | 2100PI105 | PVI | FG FRM Storage | 6.000 | 0.000 | barg |
| FCS2101 | DR0021 | 2100PI106 | PVI | NG FRM Storage | 6.000 | 0.000 | barg |
| FCS2101 | DR0021 | 2100FI064 | PVI | FG | 250.0 | 0.0 | NM³/H |
| FCS2101 | DR0021 | 2100PI107 | PVI | FG | 6.000 | 0.000 | barg |
| FCS2101 | DR0021 | 2100PI109 | PVI | LLP STEAM | 4.500 | 0.000 | barg |
| FCS2101 | DR0021 | 2100PI110 | PVI | LP STEAM | 15.00 | 0.00 | barg |
| FCS2101 | DR0035 | 2100FC005 | PID-STC | CRUDE Flow | 300.0 | 0.0 | m³/h |
| FCS2101 | DR0035 | 2100FC010 | PID-STC | KERO Flow | 50.00 | 0.00 | m³/h |
| FCS2101 | DR0035 | 2100FC014 | PID-STC | ATM RESID Flow | 200.0 | 0.0 | m³/h |
| FCS2101 | DR0035 | 2100FC029 | PID-STC | SPRHTD LLPS | 11000 | 0 | kg/h |
| FCS2101 | DR0035 | 2100FC030 | PID-STC | SPRHTD LLPS | 2000 | 0 | kg/h |
| FCS2101 | DR0035 | 2100FC051 | PID-STC | SPRHTD LLPS | 1500 | 0 | kg/h |
| FCS2101 | DR0035 | 2100FC052 | PID-STC | SOUR WTR | 8.000 | 0.000 | m³/h |
| FCS2101 | DR0035 | 2100FC053 | PID-STC | UNSTAB NAPH | 30.00 | 0.00 | m³/h |
| FCS2101 | DR0035 | 2100FC057 | PID-STC | LPG | 6.000 | 0.000 | m³/h |
| FCS2101 | DR0035 | 2100FC072 | PID-STC | MIN TOP PA | 1500 | 0 | m³/h |
| FCS2101 | DR0035 | 2100FC073 | PID-STC | MIN MID PA P | 300.0 | 0.0 | m³/h |
| ... | ... | ... | ... | ... | ... | ... | ... |

US 10,943,078 B2

TAG IDENTIFICATION DEVICE, TAG IDENTIFICATION METHOD, AND NON-TRANSITORY COMPUTER READABLE STORAGE MEDIUM

CROSS-REFERENCE TO RELATED APPLICATIONS

This application is based on and claims priority under 35 U.S.C. § 119 from Japanese Patent Application No. 2018-017606 filed on Feb. 2, 2018, the contents of which are incorporated herein by reference.

BACKGROUND

Technical Field

One or more embodiments of the present invention relate to a tag identification device, a tag identification method and a non-transitory computer readable storage medium.

Related Art

Various products such as petroleum refined products, petrochemicals, electric power, gas, glass, paper and pulp are manufactured by process systems in plants, factories, etc. (hereinafter collectively referred to as "plants"). In plants, process control systems for controlling a variety of state quantities (e.g., pressure, temperature, flow rate, level, etc.) in process systems are constructed and a high level of automatic work is realized. One such process control system is a distributed control system (DCS) in which operation monitors and controllers are arranged in a distributed manner as.

The scale of a distributed control system constructed in a plant increase or decreases generally depending on the scale of the plant. Accordingly, handled data (input values from various field devices that measure process state quantities, output values from distributed controllers to adjustment valves and rotational devices, history values from the past several hours to the present for monitoring, etc.) scores also increase or decrease depending on the scale of a plant and may reach thousands to tens of thousands of points in large-scale plants. In distributed control systems, identification information called a "tag" is allocated to each piece of data and various types of data are handled using tags.

Japanese Patent No. 4399773 discloses an example of a conventional distributed control system. Specifically, Japanese Patent No. 4399773 discloses a distributed control system in which a plurality of field devices and controllers are connected to a network, a controller acquires a measurement result of a measurement instrument (a flowmeter, a thermometer or the like) which is a kind of field device and operates an operation device (a valve or the like) which is a kind of field device according to the measurement result.

Incidentally, various types of data handled in the aforementioned distributed control system represent operating conditions of a plant from the past to the present and thus can be considered to be widely used for monitoring, diagnosis, analysis of causes of disadvantages and the like of performance of an operator and performance (stability, profitability, energy efficiency, productivity, etc.) of operation in addition to various devices, apparatuses and facilities installed in the plant, for example. However, distributed control system manufacturers are generally not process manufacturers of oil companies, chemical companies and the like and do not have the chemical engineering knowledge of processes into which their systems are introduced or knowledge of various types of work (including operation knowledge) in plants, and thus they have had difficulty using the aforementioned various types of data for purposes other than the purpose of monitoring and controlling processes. Accordingly, the aforementioned various types of data are basically used only to monitor and control processes and are generally discarded after being used to monitor and control processes or provided to a higher system such as a plant information management system on demand.

Since the name of a tag (tag name) allocated to data handled in a distributed control system can be arbitrarily set by an end user (process operator), a tag name is set as a name that is easily understood by an end user, for example, in many cases. Accordingly, only the end user who sets the tag names knows which process value (tower top pressure value of an atmospheric distillation tower, or the like) is assigned data (tag data) handled using a tag in a distributed control system in many cases. Further, a short comment character string can be additionally defined for each tag but this is also set as a name that is easily understood by an end user and thus only the end user can be aware of it in many cases. Even when a manufacturer of a distributed control system intends to use tag data handled in the distributed control system for end users for purposes other than the purpose of monitoring and controlling a process by acquiring the chemical engineering knowledge of the process and the knowledge of various types of work in the plant, it is impossible to be aware of a process value to which tag data is allocated unless a user asks an end user in the case of a system which has already been introduced. For this reason, the tag data cannot be used without checking with the end user.

If the manufacturer of the distributed control system can learn a correspondence relationship between tag names and process values from an end user who has set the tag names, it is possible to use the aforementioned tag data for purposes other than the purpose of monitoring and controlling a process. However, to learn the correspondence relationship between tag names and process values from the end user, it is necessary to explain the purpose, effect, cost and the like to the end user and then obtain agreement of the end user. Accordingly, when agreement of the end user is not obtained, tag data handled in the distributed control system cannot be used for purposes other than the purpose of monitoring and controlling a process even though it is caused by the end user. This is not limited to the distributed control system and may occur throughout systems which handle data in a tagging manner.

SUMMARY

A tag identification device according to one or more embodiments of the present invention automatically may identify a correspondence relationship between a tag name arbitrarily set by a user and a process value, and the tag identification device may include a processor that, in a first process, obtaining first definition information in which the tag name, a type of tag data handled using the tag name, an upper limit value, a lower limit value, and an engineering unit are defined for each tag, extracting a tag, which coincides with at least one of the type of tag, the upper limit value, the lower limit value, and the engineering unit of a predetermined first process value, from the first definition information. The processor further selects the tag data, which is handled using the tag name defined for the extracted tag, using an actual measurement value of the tag data. The processor further identifies the selected tag data as the first process value.

Embodiments of the present invention will become apparent from the following detailed description with reference to the attached drawings.

BRIEF DESCRIPTION OF THE DRAWINGS

FIG. 3 is a diagram showing an example of a tag list according to one or more embodiments of the present invention.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

One or more embodiments of the present invention provide a tag identification device, a tag identification method and a tag identification program which is capable of automatically identifying a correspondence relationship between tag names arbitrarily set by a user and process values.

Hereinafter, a tag identification device, a tag identification method and a tag identification program according to one or more embodiments of the present invention will be described in detail with reference to the drawings.

[Process Control System]

Figure 1:
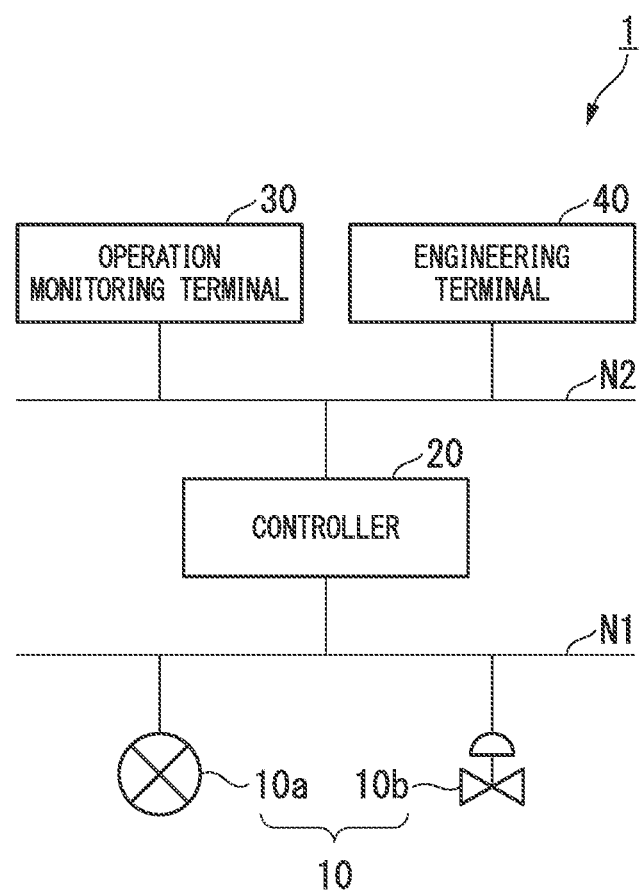
FIG. 1 is a block diagram showing a configuration of a main part of a process control system using a tag identification device, a tag identification method and a tag identification program according to one or more embodiments of the present invention.

FIG. 1 is a block diagram showing a configuration of a main part of a process control system using a tag identification device, a tag identification method and a tag identification program according to one or more embodiments of the present invention. As shown in FIG. 1, the process control system 1 includes a field device 10, a controller 20, an operation monitoring terminal 30 and an engineering terminal 40 and controls processes realized in a plant (not shown) by controlling the field device 10 through the controller 20 according to instructions and the like from the operation monitoring terminal 30.

Here, the field device 10 and the controller 20 are connected to a field network N1 and the controller 20, the operation monitoring terminal 30 and the engineering terminal 40 are connected to a control network N2. For example, the field network N1 is a wired network installed in the field of the plant. On the other hand, the control network N2 is a wired network that connects the field of the plant and a monitor room, for example. Meanwhile, the field network N1 and the control network N2 may be wireless networks.

The field device 10 is a sensor device such as a flowmeter or a temperature sensor, a valve device such as a flow rate control valve or an on-off valve, an actuator device such as a fan or a motor or another device installed in the field of the plant. Meanwhile, a case in which a state quantity in a process to be controlled is a flow rate of a fluid is described as an example in one or more embodiments of the present invention for facilitation of understanding. Accordingly, FIG. 1 illustrates one sensor device 10a that measures a flow rate of a fluid and one valve device 10b that controls (operates) a flow rate of a fluid among a plurality of field devices 10 installed in the plant.

The controller 20 controls field devices 10 by performing communication with the field devices 10 according to instructions from the operation monitoring terminal 30. Specifically, the controller 20 acquires a process value measured through a certain field device 10 (e.g., the sensor device 10a) and controls the other field device 10 (e.g., the valve device 10b) by calculating and transmitting an operation quantity of the other field device 10 (e.g., the valve device 10b). Here, a tag is allocated to each piece of data handled in the controller 20 and the controller 20 handles various types of data using tags. Meanwhile, although FIG. 1 illustrates only one controller 20 for facilitation of understanding, a plurality of controllers 20 may be provided for several control loops.

The operation monitoring terminal 30 is a terminal used to monitor a process operated by an operator of the plant, for example. Specifically, the operation monitoring terminal 30 acquires input/output data of the field devices 10 from the controller 20, transmits behaviors of the field devices 10 and the controller 20 which constitute the process control system 1 to the operator and controls the controller 20 on the basis of instructions of the operator.

The engineering terminal 40 is a terminal for creating information, programs and the like to be set in the field devices 10, the controller 20 and the operation monitoring terminal 30 on the basis of design information (design information of the plant including the process control system 1) stored in an instrumentation database which is not shown. In addition, the engineering terminal 40 automatically identifies a correspondence relationship between tag names and process values used in the controller 20. Hereinafter, a configuration of the engineering terminal 40 as a tag identification device will be described in detail.

[Tag Identification Device]

Figure 2:
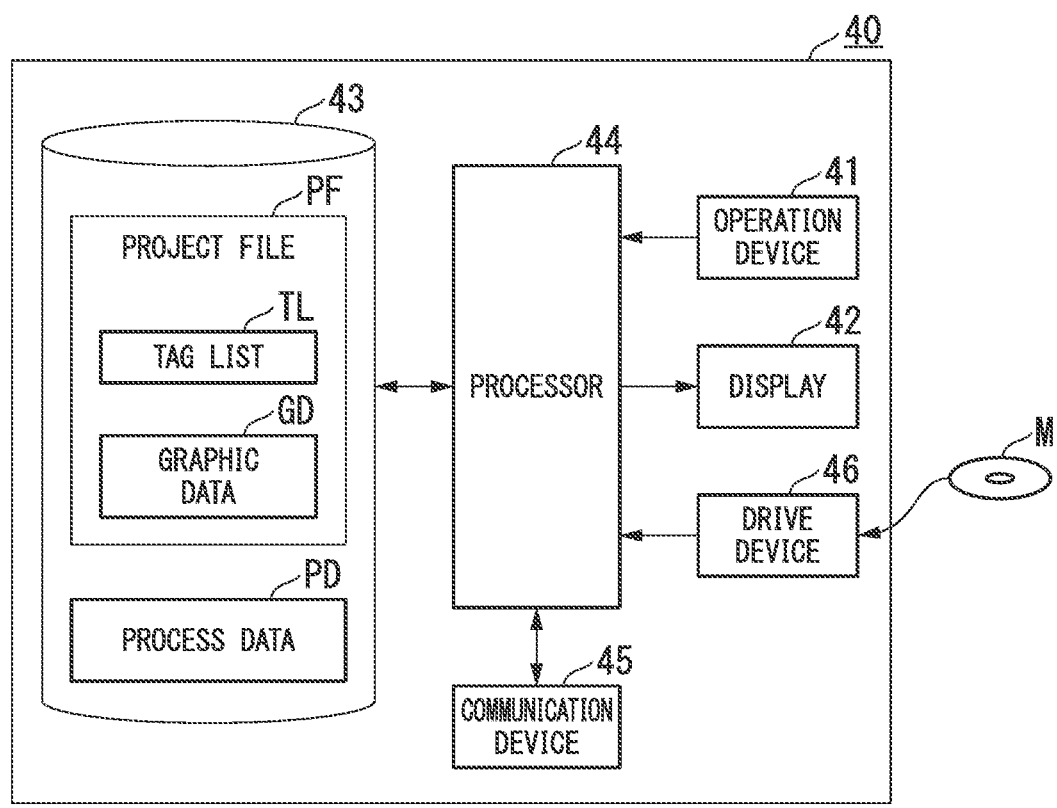
FIG. 2 is a block diagram showing a configuration of a main part of an engineering terminal as a tag identification device according to one or more embodiments of the present invention.

FIG. 2 is a block diagram showing a configuration of a main part of the engineering terminal as a tag identification device. As shown in FIG. 2, the engineering terminal 40 includes an operation device 41, a display 42, a storage device 43, a processor 44 (processing means), a communication device 45 and a drive device 46. This engineering terminal 40 is realized by a personal computer or a workstation, for example.

The operation device 41 includes an input device such as a keyboard or a pointing device, for example, and outputs an instruction (instruction for the engineering terminal 40) according to operation of an operator who uses the engineering terminal 40 to the processor 44. The display 42 includes a display device such as a liquid crystal display device, for example, and displays various types of information output from the processor 44. Meanwhile, the operation device 41 and the display 42 may be physically separated or may be physically integrated like a touch panel type liquid crystal display device including both a display function and an operation function.

The storage device 43 includes an auxiliary storage device such as a hard disk drive (HDD) or a solid state drive (SSD), for example, and stores various types of data. For example, the storage device 43 stores a project file PF and process data PD (actual measurement values of tag data). Meanwhile, although not shown in FIG. 2, various programs executed in the engineering terminal 40 are also stored in the storage device 43.

The aforementioned project file PF is a definition file in which various types of data used in the process control system 1 are defined and includes a tag list TL (first defined information) and graphic data GD (second defined information). The tag list TL is a list including definition information on tag data handled in the controller 20 using tags. The graphic data GD is data including definition information on a monitor screen (graphics) displayed on the operation monitoring terminal 30. Meanwhile, the tag list TL and the graphic data GD included in the project file PF will be described in detail later.

The process data PD is data (past tag data) used for process control in the past. For example, the process data PD includes data representing process values measured through the sensor device 10a, data representing operation quantities of the valve device 10b and the like, and various alarms. The process data PD is data that is originally accumulated in the controller 20 and cannot be accessed without previously designated authority. To facilitate description, it is assumed that the communication device 45 receives the process data PD, and the same process data PD accumulated in the controller 20 is stored in the storage device 43 in one or more embodiments of the present invention.

The processor 44 controls operation of the engineering terminal 40 in an integrated manner on the basis of an operation instruction input from the operation device 41 or an instruction transmitted through the control network N2. For example, when an instruction for creation of information to be set to the controller 20 is input from the operation device 41, the processor 44 performs a process of creating necessary information on the basis of design information stored in the instrumentation database which is not shown. In addition, the processor 44 performs a process of automatically identifying a correspondence relationship between tag names and process values used in the controller 20. Meanwhile, processes performed in the processor 44 will be described in detail later.

The communication device 45 is controlled by the processor 44 to perform communication through the control network N2. Meanwhile, the communication device 45 may perform wired communication or wireless communication. The drive device 46 reads data recorded in a computer readable recording medium M such as a CD-ROM or a DVD (registered trademark)-ROM, for example. This recording medium M stores a program for realizing the function of each block (e.g., the function of the processor 44) of the engineering terminal 40.

A program stored in the recording medium M is read by the drive device 46 and installed in the engineering terminal 40 to realize the function of each block of the engineering terminal 40 in a software manner. That is, such a function is realized by cooperation between software and hardware resources. Meanwhile, a program for realizing the function of each block of the engineering terminal 40 may be distributed on the recording medium M or through an external network such as the Internet.

<Tag List>

FIG. 3 is a diagram showing an example of a tag list used in one or more embodiments of the present invention. As described above, the tag list TL is a list including definition information on tag data handled using tags in the controller 20. In the example shown in FIG. 3, "FCS name," "drawing," "tag name," "tag type," "tag comment," "upper limit value," "lower limit value" and "engineering unit" are defined for each tag.

"FCS name" is information for specifying a controller 20 in which each tag has been defined. As this information, identification information (identification name) allocated to each controller 20 in advance is used. For example, "FCS2101" is defined as "FCS name" in the example shown in FIG. 3. Meanwhile, although only "FCS2101" is defined as "FCS name" in the example shown in FIG. 3, when a plurality of controllers 20 are provided, identification information allocated to the respective controllers 20 is defined as "FCS name."

"Drawing" is information for specifying a control drawing in which each tag has been defined. Here, control drawing defines a control function of a controller 20 and is prepared for each control loop, for example. As information for specifying a control drawing, identification information (identification name) allocated to each control drawing in advance is used. For example, "DR0021" and "DR0035" are defined as "drawing name" in the example shown in FIG. 3.

"Tag name" is the name of a tag allocated to each piece of tag data handled in a controller 20. This tag name can be arbitrarily set by an end user (e.g., a plant manager). In the example shown in FIG. 3, character strings each of which is composed of a total of 9 characters of a specific 4-digit figure ("2100"), an arbitrary 2-character English letter ("FI," "PI," "FC" or the like) and an arbitrary 3-digit figures are defined as "tag information."

"Tag type" is information representing a tag type. In the example shown in FIG. 3, "PVI" and "PID-STC" are defined as "tag type." A tag (tag data) for which "PVI" is defined as "tag type" refers to a tag (tag data) for monitoring and a tag (tag data) for which "PID-STC" is defined as "tag type" refers to a tag (tag data) for control.

"Tag comment" is additional information of a tag. This tag comment can be arbitrarily set by an end user (e.g., a plant manager) and defines information representing which state quantity is represented by a tag, for example. "Upper limit value" is a value that defines an upper limit value of a tag data scale and "lower limit value" is a value that defines a lower limit value of a tag data scale.

"Engineering unit" is information representing a unit of tag data handled using a tag. For example, when tag data represents pressure, Pascal (PA), Pascals Absolute (PAA), bar, barg (gauge pressure), Pounds per Square Inch Absolute (PSIA), Pounds per Square Inch Gauge (PSIG) and the like are defined as "engineering unit." In addition, when tag data represents a flow rate, kg/h, t/h, $m^3/h$, $nm^3/h$ and the like are defined as "engineering unit."

<Graphic Data>

Figure 4:
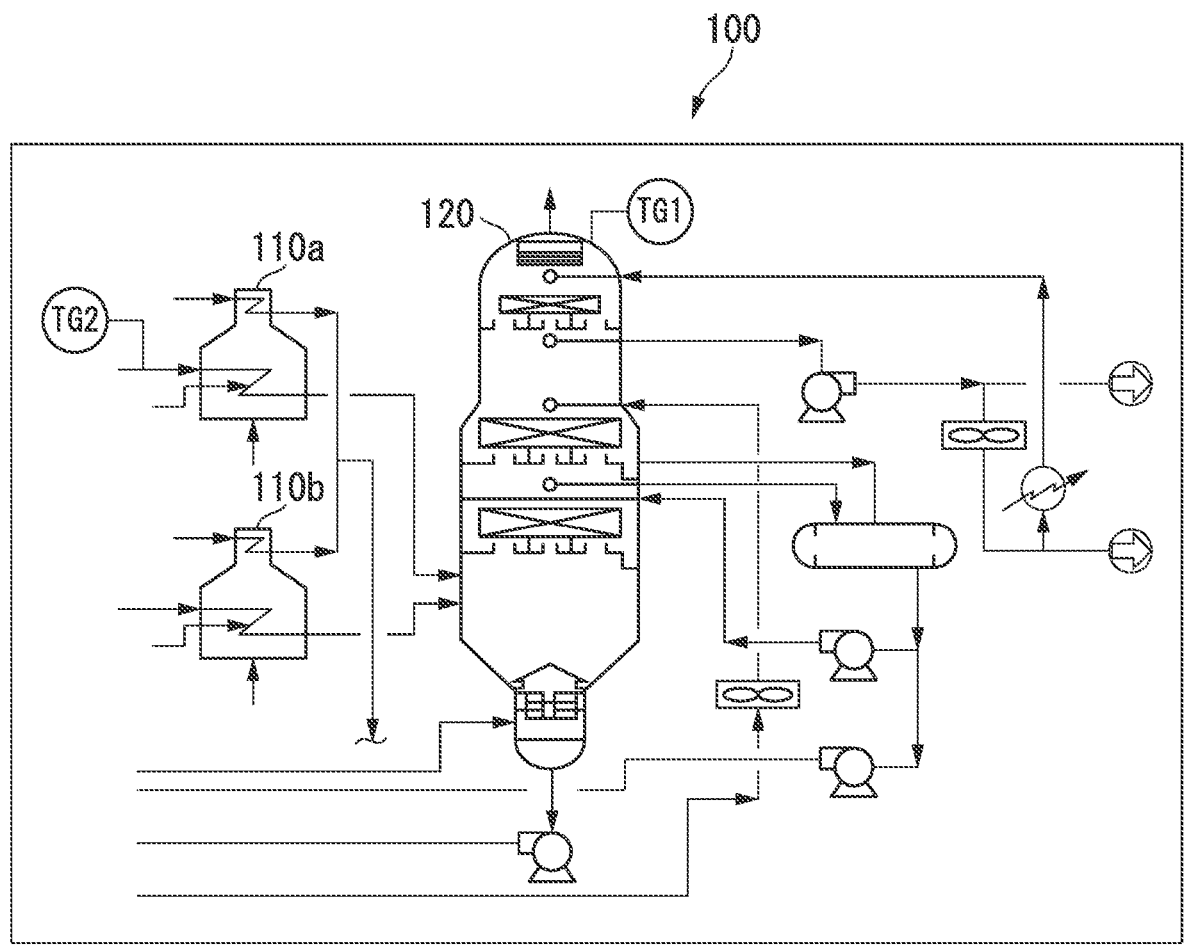
FIG. 4 is a diagram schematically showing an example of graphics according to one or more embodiments of the present invention.
Figure 5:
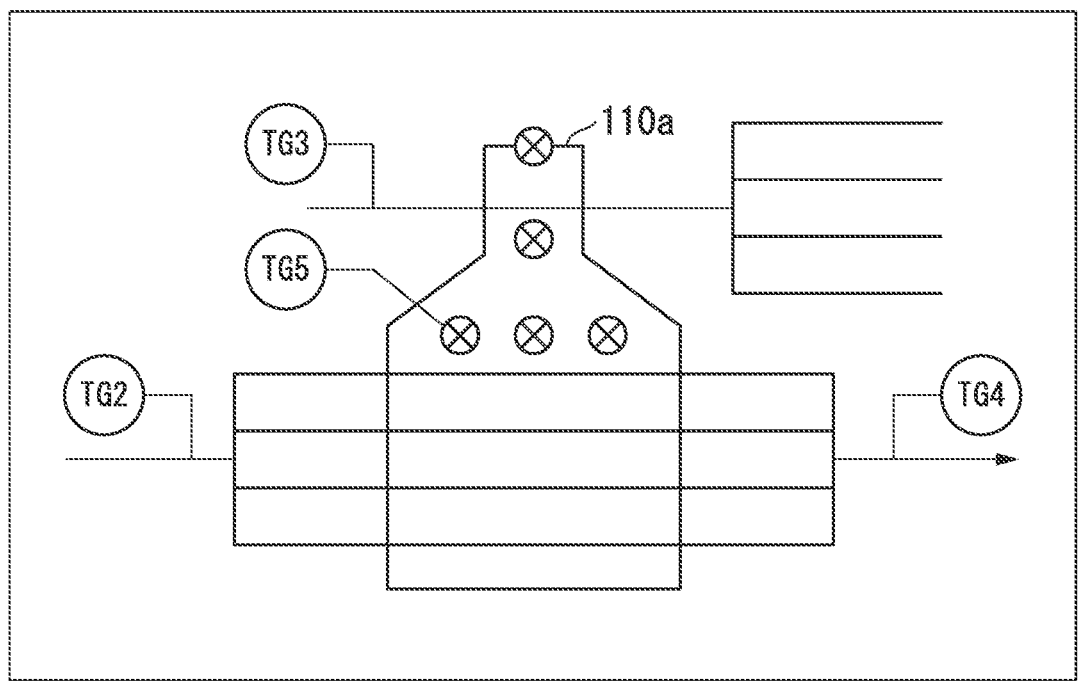
FIG. 5 is a diagram schematically showing an example of graphics according to one or more embodiments of the present invention.

FIGS. 4 and 5 are diagrams schematically showing examples of graphics used in one or more embodiments of the present invention. Meanwhile, it is noted that graphics are extremely schematically illustrated in FIGS. 4 and 5 in order to facilitate understanding. As described above, graphics are monitoring screens displayed on the operation monitoring terminal 30. These graphics model a piping and instrumentation diagram of a plant and represent various apparatuses, devices and equipment of the plant using simple figures (a circle, a rectangle, a line, an arrow and the like) and characters (text).

In addition, the graphics display tag data (temperature value, flow rate value, etc.) used in apparatuses displayed on the monitoring screen as graphics. Further, to easily recognize what tag data is, a tag name may be displayed attached to the tag data. Accordingly, graphic data GD necessary to display graphics includes information indicating types (a circle, a rectangle and the like) of figures that represent apparatuses and the like of a plant, information indicating a display position of each figure in the monitoring screen, information indicating a tag name of tag data displayed in the monitoring screen, information indicating a display position of tag data and a tag name, and the like. Meanwhile, although information indicating a tag name is included in graphics here in order to facilitate explanation, information indicating a tag name may be provided separately from the graphic data GD in a state in which the information is associated with the graphic data GD.

The graphics illustrated in FIG. 4 are graphics with respect to a refinery vacuum distillation apparatus 100 including heating furnaces 110a and 110b and a distillation tower 120. The heating furnaces 110a and 110b are provided with fuel and steam and, for example, heat crude oil as a raw material for products. The distillation tower 120 distills the crude oil (heated crude oil) supplied from the heating furnaces 110a and 110b. Further, the graphics illustrated in FIG. 4 display a tag name TG1 of a tag indicating the column pressure of the distillation tower 120 and a tag name TG2 of a tag indicating the furnace pass flow of the raw material in the heating furnace 110a.

The graphics illustrated in FIG. 5 are graphics with respect to only the heating furnace 110a in the refinery vacuum distillation apparatus 100 shown in FIG. 4. In the example shown in FIG. 5, the heating furnace 110a is enlarged and displayed compared to that shown in FIG. 4. Further, the graphics illustrated in FIG. 5 display a tag name TG3 of a tag indicating the furnace velocity steam flow used in the heating furnace 110a, a tag name TG4 of a tag indicating the furnace pass outlet temperature of the heating furnace 110a and a tag name TG5 of a tag indicating the radiant zone temperature of the heating furnace 110a in addition to the tag name TG2 of the tag indicating the furnace pass flow of the raw material in the heating furnace 110a.

Figure 6:
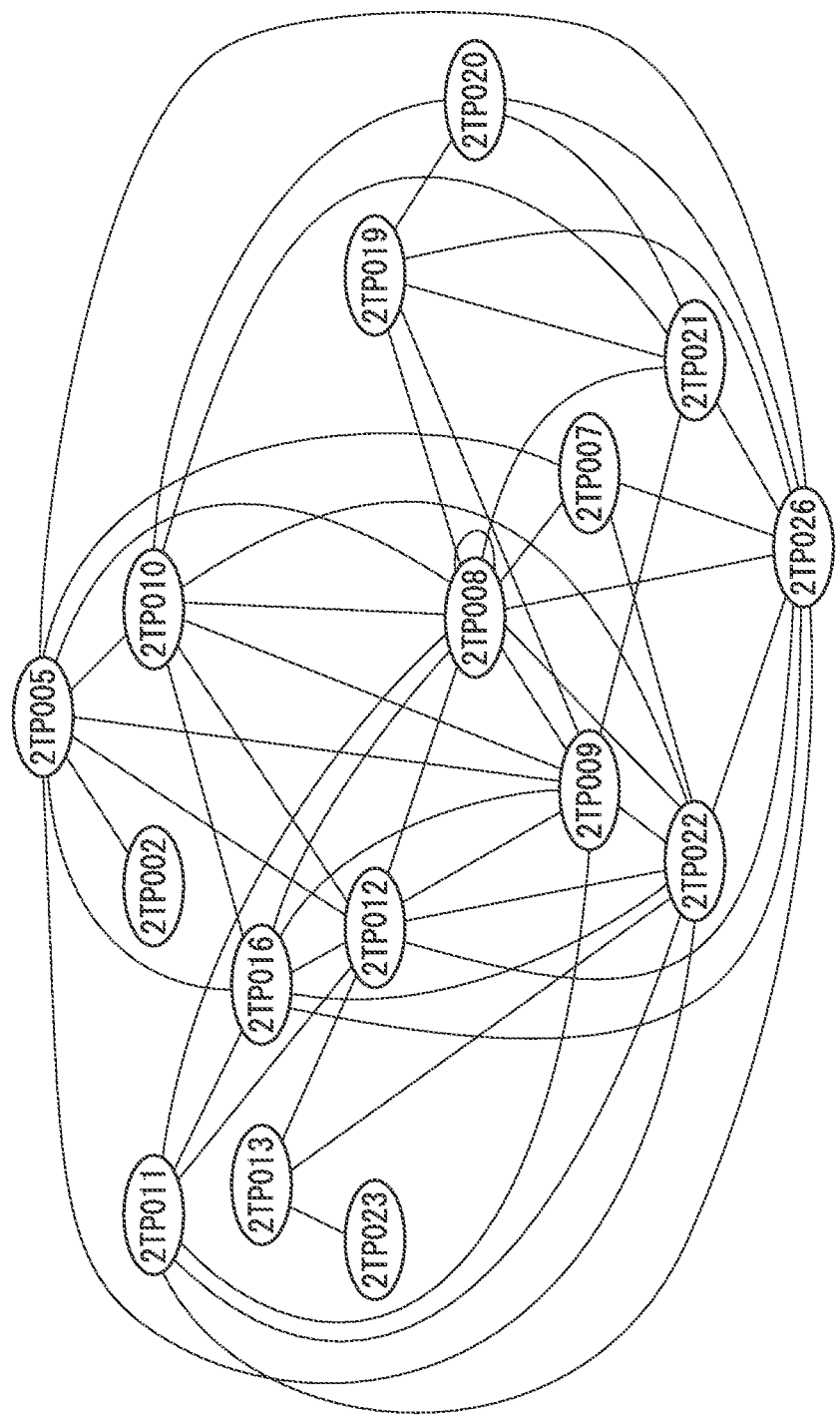
FIG. 6 is a diagram showing an example of a mutual relationship between graphics according to one or more embodiments of the present invention.

Here, graphics are monitoring screens displayed on the operation monitoring terminal 30 as described above. Accordingly, graphics are associated with each other, as shown in FIG. 6, and graphics displayed on the operation monitoring terminal 30 can be switched to graphics associated therewith according to an instruction of an operator who uses the operation monitoring terminal 30. FIG. 6 is a diagram showing an example of a mutual relationship between graphics used in one or more embodiments of the present invention.

For example, the graphics illustrates in FIG. 4 are graphics "2TP012" in FIG. 6 and the graphics illustrated in FIG. 5 are graphics "2TP016" in FIG. 6. As shown in FIG. 6, since these graphics are connected to each other and associated with each other, the graphics shown in FIG. 4 can be switched to the graphics shown in FIG. 5 when the graphics shown in FIG. 4 are displayed on the operation monitoring terminal 30 and the graphics shown in FIG. 5 can be switched to the graphics shown in FIG. 4 when the graphics shown in FIG. 5 are displayed on the operation monitoring terminal 30 according to instructions of an operator who uses the operation monitoring terminal 30.

The graphic data GD is of course used when graphics are displayed on the operation monitoring terminal 30, but is also used in cases other than a case in which graphics are displayed on the operation monitoring terminal 30. For example, the graphic data GD is also used when the processor 44 of the engineering terminal 40 performs a process of automatically identifying a correspondence relationship between a tag name and a process value. Specifically, the graphic data GD is used when graphics are sequentially traced on the basis of the relationship shown in FIG. 6 to search for a tag name included in graphic data.

[Tag Identification Method]

Figure 7:
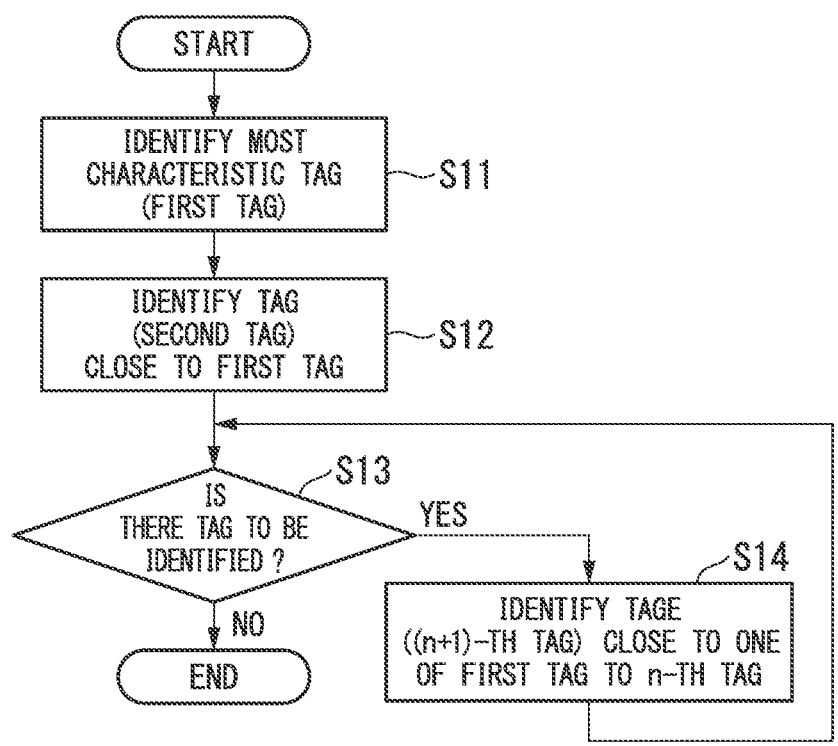
FIG. 7 is a flowchart showing the overview of a tag identification method according to one or more embodiments of the present invention.

Next, a tag identification method according to one or more embodiments of the present invention will be described. FIG. 7 is a flowchart showing the overview of a tag identification method according to one or more embodiments of the present invention. The flowchart shown in FIG. 7 starts when operation of the process control system 1 newly constructed in a plant starts, when the process control system 1 which has been constructed in the plant is updated (e.g., update of a control program used in the controller 20) and then operated, when information about a tag is changed, and the like, for example.

In short, the tag identification method according to one or more embodiments of the present invention is a method in which some characteristic process values are selected in advance and the engineering terminal 40 automatically identifies a correspondence relationship between the selected process values and tag names using the project file PF and process data PD. For example, characteristic process values selected in advance may be process values that can be easily distinguished from other process values. For example, at least one of items ("tag type," "tag comment," "upper limit value," "lower limit value" and "engineering unit") defined in the tag list TL shown in FIG. 3 may select a process value different (or extremely separated) from other process values.

To facilitate understanding in the following, it is assumed that the following process values in the distillation tower 120 shown in FIG. 4 and the heating furnace 110a shown in FIGS. 4 and 5 are selected in advance as the aforementioned characteristic process values.

Column pressure of distillation tower 120
Furnace pass flow of raw material in heating furnace 110a
Furnace velocity steam flow used in heating furnace 110a
Furnace pass outlet temperature of heating furnace 110a
Radiant zone temperature of heating furnace 110a The column pressure of the distillation tower 120 is a most characteristic process value with respect to the fact that it is the lowest pressure in the refinery vacuum distillation apparatus 100. The furnace pass flow of the raw material, the furnace velocity steam flow, the furnace pass outlet temperature and the radiant zone temperature in the heating furnace 110a are selected as process values obtained in a place close to the column pressure of the distillation tower 120 which is the most characteristic process value.

When the process of the flowchart shown in FIG. 7 starts, first, the processor 44 of the engineering terminal 40 performs a process (first process) of identifying a most characteristic tag (first tag) (step S11: first step). Specifically, using the tag list TL of the project file PF and the process data PD, the processor 44 of the engineering terminal 40 performs a process of identifying a tag corresponding to the column pressure of the distillation tower 120 which is the most characteristic process value.

Specifically, the processor 44 performs a process of extracting tags, which coincides with all of the following three extraction conditions, from the tag list TL of the project file PF.

(1) Tag having "engineering unit" of a pressure (e.g., PA, PAA, bar, barg, PSIA, PSIG or the like)

(2) Tag having "tag type" of "PID" or "PVD"

(3) Tag which is a tag of absolute pressure or gauge pressure and has a minus "lower limit value"

In addition, along with the aforementioned process, the processor 44 performs a process of extracting tag data (tag) having actual measurement values in the range of 0 to 200 [mbar] or 0 to 20 [kPa] from the process data PD. Then, the processor 44 performs a process of identifying a tag allocated to tag data having the smallest actual measurement value among the tag data extracted from the process data PD, among the tags extracted from the tag list TL of the project file PF as the tag (first tag) corresponding to the column pressure of the distillation tower 120 which is the most characteristic process value.

Here, in a case where there are a plurality of tags (process values) to be identified, the processor 44 performs the aforementioned tag extraction process in consideration of similarity of tag names. For example, a case in which there are a plurality of tags (process values) to be identified may be a case in which, when one pipe is branched into a plurality of pipes, a plurality of tags corresponding to flow rates of fluid flowing through the branched pipes are identified. Tag name of such tags are similar in many cases and thus similarity of tag names is considered when a tag is extracted.

The processor 44 determines the similarity of tag names by comparing tag names from head of the tag names by one character to determine whether or not each character is the same, for example. For example, when there are tag names of "FIC104A," "FIC104B," "FIC2022" and "FIO2112," similarity for the tag name of "FIC104A" is determined as follows.

"FIC104B": similarity 6/7 (6 characters from the head are identical in 7 characters)

"FIC2022": similarity 3/7 (3 characters from the head are identical in 7 characters)

"FIO2112": similarity 2/7 (2 characters from the head are identical in 7 characters)

That is, similarity of the tag name of "FIC104B" is determined to be highest with respect to the tag name of "FIC104A."

Subsequently, the processor 44 of the engineering terminal 40 performs a process (second process) of identifying a tag (second tag) close to the most characteristic tag (first tag) (step S12: second step). Specifically, the processor 44 of the engineering terminal 40 performs a process of identifying a tag corresponding to the furnace pass flow of a raw material in the heating furnace 110a which is obtained at a position close to the position at which the column pressure of the distillation tower 120 which is the most characteristic process value is obtained using at least one of the tag list TL of the project file PF, the graphic data GD of the project file PF and the process data PD.

Specifically, the processor 44 performs a process of extracting tags that coincide with all of the following three extraction conditions from the tag list TL of the project file PF and creating tag groups.

(1) Tag having "engineering unit" of a flow rate (e.g., kg/h, $m^3$/h, t/h, $nm^3$/h or the like)

(2) Tag having "tag type" of "PID" or "PVD"

(3) Tag having "upper limit value" and "lower limit value" which are identical

When tag groups created through the aforementioned process are equal to or greater than "4", the processor 44 performs a process of extracting tags having more than a certain "lower limit value". For example, the processor 44 performs a process of extracting tags having "lower limit values" of 2000 [kg/h] or higher, tags having "lower limit values" of 50 [$m^3$/h] or higher and tags having "lower limit values" of 2 [t/h] or higher. On the other hand, when tag groups created through the aforementioned process are "2", the processor 44 performs a process of increasing "lower limit value" and extracting tags. Here, when there are a plurality of tags (process values) to be identified, the processor 44 may perform the aforementioned process of extracting tags in consideration of similarity of tag names.

The processor 44 performs a process of extracting tag groups present in graphics including the tag (first tag) identified as corresponding to the column pressure of the distillation tower 120 which is the most characteristic process value among tag groups remaining in the above-described process. If there is no tag group extracted in this process, the processor 44 performs the aforementioned process of extracting (searching for) tag groups by sequentially tracing other graphics from graphics including the first tag on the basis of the relationship between graphics shown in FIG. 6. Then, the processor 44 performs a process of identifying a tag group that has been extracted first or a tag group that has most frequently appeared as a tag (second tag) corresponding to the furnace pass flow of the raw material in the heating furnace 110a. When tag groups have the same number of appearances, the processor 44 performs a process of identifying a tag group having a larger sum of actual measurement values as the tag (second tag) corresponding to the furnace pass flow of the raw material in the heating furnace 110a. By performing this process, the tag having the tag name TG2 attached thereto in FIGS. 4 and 5, for example, is identified as the tag (second tag) corresponding to the furnace pass flow of the raw material.

When the above-described process ends, the processor 44 of the engineering terminal 40 determines presence or absence of a tag to be identified (step S13). Since the furnace velocity steam flow, furnace pass outlet temperature and radiant zone temperature used in the heating furnace 110a are present as tag to be identified here, the determination result is "YES."

Then, the processor 44 of the engineering terminal 40 performs a process (third process) of identifying a tag (third tag) close to any of the first tag and the second tag (step S14: third step). Specifically, the processor 44 of the engineering terminal 40 performs a process of identifying a tag corresponding to the furnace velocity steam flow used in the heating furnace 110a which is obtained at a position close to any of the position at which the column pressure of the distillation tower 120 which is the most characteristic process value is obtained and the position at which the furnace pass flow of the raw material in the heating furnace 110a is obtained from the tag list TL of the project file PF or the graphic data GD.

Specifically, the processor 44 performs a process of extracting tags having "engineering unit" of flow rates from graphics including the tag (second tag) identified as corresponding to the furnace pass flow of the raw material in the heating furnace 110a. Meanwhile, when there are a plurality of tags (process values) to be identified, the processor 44 may perform the aforementioned process of extracting tags in consideration of similarity of tag names. Then, the processor 44 performs a process of identifying a tag group including tags having the same number of flow rate values that are large next to the furnace pass flow of the raw material in the heating furnace 110*a* as the tag (third tag) corresponding to the furnace velocity steam flow used in the heating furnace 110*a*. If there is no tag group extracted in this process, the processor 44 performs the aforementioned process of extracting (searching for) tag groups by sequentially tracing other graphics from graphics including the second tag on the basis of the relationship between graphics shown in FIG. 6.

When the above-described process ends, the processor 44 of the engineering terminal 40 determines presence or absence of a tag to be identified again (step S13). Since the furnace pass outlet temperature and the radiant zone temperature of the heating furnace 110*a* are present as tags to be identified here, the determination result is "YES."

Then, the processor 44 of the engineering terminal 40 performs the process (third process) of identifying a tag (fourth tag) close to one of the first to third tags (step S14: third step). Specifically, the processor 44 of the engineering terminal 40 performs a process of identifying a tag corresponding to the furnace pass outlet temperature of the heating furnace 110*a* obtained at a position close to one of the position at which the column pressure of the distillation tower 120 which is the most characteristic process value is obtained, the position at which the furnace pass flow of the raw material in the heating furnace 110*a* is obtained and the position at which the furnace velocity steam flow used in the heating furnace 110*a* is obtained from the tag list TL of the project file PF or the graphic data GD.

Specifically, the processor 44 performs a process of extracting a tag having "engineering unit" of temperature and "tag type" of "PID" from graphics including the tag (second tag) identified as corresponding to the furnace pass flow of the raw material in the heating furnace 110*a*. Meanwhile, when there are a plurality of tags (process values) to be identified, the processor 44 may perform the process of extracting a tag in consideration of similarity of tag names. Then, the processor 44 performs a process of identifying a tag for which a maximum range has been set and which has a maximum actual measurement value as the tag (fourth tag) corresponding to the furnace pass outlet temperature of the heating furnace 110*a*.

When the above-described process ends, the processor 44 of the engineering terminal 40 determines presence or absence of a tag to be identified again (step S13). Since the radiant zone temperature of the heating furnace 110*a* is present as a tag to be identified here, the determination result is "YES."

Then, the processor 44 of the engineering terminal 40 performs the process (third process) of identifying a tag (fifth tag) close to one of the first to fourth tags (step S14: third step). Specifically, the processor 44 of the engineering terminal 40 performs a process of identifying a tag corresponding to the radiant zone temperature of the heating furnace 110*a* obtained at a position close to one of the position at which the column pressure of the distillation tower 120 which is the most characteristic process value is obtained, the position at which the furnace pass flow of the raw material in the heating furnace 110*a* is obtained, the position at which the furnace velocity steam flow used in the heating furnace 110*a* is obtained and the position at which the furnace pass outlet temperature of the heating furnace 110*a* is obtained from the tag list TL of the project file PF or the graphic data GD.

Specifically, the processor 44 performs a process of extracting a tag for which ranges defined as "upper limit value" and "lower limit value" are 0 to 1000 [° C.] from graphics including the furnace pass flow of the raw material in the heating furnace 110*a* or other close graphics associated with the graphics. Meanwhile, when there are a plurality of tags (process values) to be identified, the processor 44 may perform the aforementioned process of extracting a tag in consideration of similarity of tag names. Then, the processor 44 performs a process of identifying the extracted tag as the tag (fifth tag) corresponding to the radiant zone temperature of the heating furnace 110*a*.

When the above-described process ends, the processor 44 of the engineering terminal 40 determines presence or absence of a tag to be identified again (step S13). Since there is no tag to be identified here, the determination result is "NO" and a series of processes shown in FIG. 7 end.

As described above, in one or more embodiments of the present invention, the processor 44 performs the process of identifying a tag corresponding to the column pressure of the distillation tower 120 which is the most characteristic process value, and then performs the process of identifying a tag corresponding to the furnace pass flow of the raw material in the heating furnace 110*a* obtained at a position close to the position at which the column pressure of the distillation tower 120 which is the most characteristic process value is obtained. Then, the processor 44 repeats the process of identifying tags (the furnace velocity steam flow, the furnace pass outlet temperature and the radiant zone temperature used in the heating furnace 110*a*) obtained at positions close to one of the first to n-th tags. Accordingly, the processor 44 can automatically identify a correspondence relationship between tag names and process values like assembling a jigsaw puzzle. In addition, since the processor 44 can automatically identify a correspondence relationship between tag names and process values, tag data handled according to tag names can be effectively used.

In this manner, a user can immediately use a function of monitoring profitability of plant operation on a DCS without engineering by inputting tags and process values for which a correspondence relationship has been identified into monitoring application software in which monitoring knowhow and knowledge have been accumulated (such a function was not present on a DCS in conventional techniques). The monitoring knowhow and knowledge mentioned here are knowhow and knowledge indicating a tag and a process value in a plant by which profitability of plant operation can be monitored.

In this manner, the user can immediately use a function of monitoring availability and reliability of plant facilities (tower rows, tank, piping, heat exchanger, rotating machine, etc.) on a DCS without engineering by inputting tags and process values for which a correspondence relationship has been identified into monitoring application software in which monitoring knowhow and knowledge have been accumulated (such a function was not present on a DCS in conventional techniques). The monitoring knowhow and knowledge mentioned here are knowhow and knowledge indicating a tag and a process value in a plant by which availability and reliability of a plant facility can be monitored.

In this manner, the user can immediately use a function of monitoring the ability of an operator on a DCS without engineering by inputting tags and process values for which a correspondence relationship has been identified into monitoring application software in which monitoring knowhow and knowledge have been accumulated (such a function was not present on a DCS in conventional techniques). The monitoring knowhow and knowledge mentioned here are knowhow and knowledge indicating a tag and a process value in a plant by which the ability of an operator can be monitored.

In this manner, the user can immediately use a monitoring and control function (PID control, monitoring graphics, etc.) of a DCS without engineering by inputting tags and process values for which a correspondence relationship has been identified into monitoring application software in which monitoring knowhow and knowledge have been accumulated (conventionally, requirement specifications are received from a user and engineered). The monitoring knowhow and knowledge mentioned here are knowhow and knowledge indicating a tag and a process value in a plant by which availability of the monitoring and control function (PID control, monitoring graphics, etc.) of the DCS can be monitored.

Although the tag identification device, the tag identification method and the tag identification program according to one or more embodiments of the present invention have been described above, one or more embodiments of the present invention is not limited to the aforementioned embodiments and can be freely modified within the scope of the invention. For example, an example in which the engineering terminal 40 includes the function of performing the process of automatically identifying a correspondence relationship between tag names and process values has been described in the above-described embodiments. However, this function may be included in the controller 20 or the operation monitoring terminal 30.

Additionally, a program for realizing a part or all of the functions of the engineering terminal 40 of the present invention may be stored in a computer readable storage medium and the program stored in the storage medium may be read and executed by the computer system to execute a part or all of the processes performed by the engineering terminal 40. Additionally, the "computer system" mentioned herein may include OS or hardware such as peripheral devices. Further, the "computer system" also includes a WWW system having a homepage providing environment (or display environment). Further, the "computer readable storage medium" means a storage device including a portable medium such as a flexible disk, a magneto-optical disk, a ROM, and a CD-ROM or a hard disk built in the computer system.

Furthermore, the "computer readable storage medium" also includes a medium that stores a program for a predetermined time as in a volatile memory (for example, RAM: Dynamic Random Access Memory) inside the computer system which becomes a server or a client when the program is transmitted via a communication network such as an internet or a communication line such as a phone line. The program may be transmitted from a computer system storing the program in a storage device or the like to other computer systems via a transmission medium or a transmission wave in the transmission medium. Here, the "transmission medium" that transmits the program means a medium having an information transmission function as in a communication network such as an internet or a communication line such as a phone line. Further, the program may be used to realize a part of the above-described functions. Furthermore, the function may be realized by the combination of the program stored in the computer system in advance, that is, a so-called difference file (difference program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of one or more embodiments of the present invention.

The term "unit" is used to describe a component, unit or part of a hardware and/or software that is constructed and/or programmed to carry out the desired function. Typical examples of the hardware may include, but are not limited to, a device and a circuit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A tag identification device comprising:
a processor that, in a first process:
obtains first definition information in which a first tag name, a first type of a first process value handled using the first tag name, a first upper limit value, a first lower limit value, and a first engineering unit are defined for each tag;
extracting, using the first definition information, a first tag where at least one of the first type, the first upper limit value, the first lower limit value, and the first engineering unit of the first process value of the first tag coincides with at least one of a second type of a second process value handled using a second tag name that is arbitrarily set by a user, a second upper limit value, a second lower limit value, and a second engineering unit of the second process value; and
identifies that the second process value relates to the first process value.

2. The tag identification device according to claim 1, wherein the processor, in a second process:
obtains second definition information in which a plurality of graphics that are mutually related monitoring screens used for process monitoring and that include information on tag is defined;
extracts, using the first definition information, a third tag where at least one of the first type, the first upper limit value, the first lower limit value, and the first engineering unit of the first process value of the first tag coincides with at least one of a third type of a third process value handled using a third tag name arbitrarily set by the user, a third upper limit value, a third lower limit value, and a third engineering unit of the third process value;
selects first tag data using at least one of the second definition information and an actual measurement value of the first tag data, wherein the first tag data is handled using the third tag name defined for the extracted third tag; and identifies the selected first tag data as the third process value.

3. The tag identification device according to claim 2, wherein the processor repeats, in a third process:
  extracting, using at least one of the first definition information and the second definition information, a fourth tag where at least one the first type, the first upper limit value, the first lower limit value, and the first engineering unit of the first process value of the first tag coincides with at least one of a fifth type of a fifth process value handled using a fifth tag name arbitrarily set by the user, a fifth upper limit value, a fifth lower limit value, and a fifth engineering unit of a n-th ("n" is an integer which is greater than or equal to 3) process value; and
  identifying second tag data as the n-th process value, wherein the second tag data is handled using the fifth tag name defined for the extracted fifth tag.

4. The tag identification device according to claim 1, wherein in a case where there is a plurality of process values to be identified, the processor extracts the first tag based on the first tag name.

5. The tag identification device according to claim 4, wherein the processor extracts the first tag by comparing first characters included in the first tag name with second characters included in another tag name.

6. The tag identification device according to claim 2, wherein in a case where the processor uses the second definition information, the processor selects the first tag data or extracts the third tag by tracing the graphics on the basis of a relationship between the graphics.

7. The tag identification device according to claim 2, further comprising:
  a communication device that receives the first, second, and third process values measured by a field device installed in a plant; and
  a storage device that stores the first, second, and third process values, the first definition information, and the second definition information.

8. A tag identification method comprising:
  by a processor, in a first process,
    obtaining first definition information in which a first tag name, a first type of a first process value handled using the first tag name, a first upper limit value, a first lower limit value, and a first engineering unit are defined for each tag;
    extracting, using the first definition information, a first tag where at least one of the first type, the first upper limit value, the first lower limit value, and the first engineering unit of the first process value of the first tag coincides with at least one of a second type of a second process value handled using a second tag name arbitrarily set by a user, a second upper limit value, a second lower limit value, and a second engineering unit of the second process value; and
    identifying that the second process value relates to the first process value.

9. The tag identification method according to claim 8, further comprising:
  by the processor, in a second process,
    obtaining second definition information in which a plurality of graphics which are mutually related monitoring screens used for process monitoring and which include information on tag is defined;
    extracting, using the first definition information, a third tag where at least one of the first type, the first upper limit value, the first lower limit value, and the first engineering unit of the first process value of the first tag coincides with at least one of a third type of a third process value handled using a third tag name arbitrarily set by the user, a third upper limit value, a third lower limit value, and a third engineering unit of the third process value;
    selecting first tag data, which is handled using the third tag name defined for the extracted third tag, using at least one of the second definition information and an actual measurement value of the first tag data; and
    identifying the selected first tag data as the third process value.

10. The tag identification method according to claim 9, further comprising:
  repeating, by the processor, in a third process:
    extracting, using at least one of the first definition information and the second definition information, a fourth tag where at least one of the first type, the first upper limit, the first lower limit value, and the first engineering value of the first process value of the first tag coincides with at least one of a fifth type of a fifth process value handled using a fifth tag name arbitrarily set by the user, a fifth upper limit value, a fifth lower limit value, and a fifth engineering unit of a n-th ("n" is an integer which is greater than or equal to 3) process value; and
    identifying second tag data as the n-th process value, wherein the second tag data is handled using the fifth tag name for the extracted fifth tag.

11. The tag identification method according to claim 8, further comprising:
  in a case where there is a plurality of process values to be identified, extracting, by the processor, the first tag based on the first tag name.

12. The tag identification method according to claim 11, further comprising:
  extracting, by the processor, the first tag by comparing first characters included in the first tag name with second characters included in another tag name.

13. The tag identification method according to claim 9, further comprising:
  in a case where the processor uses the second definition information, selecting the first tag data or extracting the third tag, by the processor, by tracing the graphics on the basis of a relationship between the graphics.

14. The tag identification method according to claim 9, further comprising:
  receiving, by a communication device, the first, second, and third process values measured by a field device installed in a plant; and
  storing, into a storage device, the first, second, and third process values, the first definition information, and the second definition information.

15. A non-transitory computer readable storage medium storing one or more tag identification programs executed by a tag identification device, the one or more tag identification programs comprising instructions for:
  by a processor, in a first process,
    obtaining first definition information in which a first tag name, a first type of a first process value handled using the first tag name, a first upper limit value, a first lower limit value, and a first engineering unit are defined for each tag;
    extracting, using the first definition information, a first tag where at least one of the first type, the first upper limit value, the first lower limit value, and the first engineering unit of the first process value of the first tag coincides with at least one of a second type of a second process value handled using a second tag name arbitrarily set by a user, a second upper limit value, a second lower limit value, and a second engineering unit of the second process value; and identifying that the second process value related to the first process value.

16. The non-transitory computer readable storage medium according to claim 15, wherein the one or more tag identification programs further comprise instructions for:

by the processor, in a second process,
obtaining second definition information in which a plurality of graphics that are mutually related monitoring screens used for process monitoring and include information on tag is defined;

extracting, using the first definition information, a third tag where at least one of the first type, the first upper limit value, the first lower limit value, and the first engineering unit of the first process value of the first tag coincides with at least one of third type of a third process value handled using a third tag name arbitrarily set by the user, a third upper limit value, a third lower limit value, and a third engineering unit of the third process value;

selecting first tag data using at least one of the second definition information and an actual measurement value of the first tag data, wherein the first tag data is handled using the third tag name defined for the extracted third tag; and identifying the selected first tag data as the third process value.

17. The non-transitory computer readable storage medium according to claim 16, wherein the one or more tag identification programs further comprise instructions for:

repeating, by the processor, in a third process:
extracting, using at least one of the first definition information and the second definition information, a fourth tag where at least one of the first type, the first upper limit value, the first lower limit value, and the first engineering unit of the first process value of the first tag coincides with at least one of a fifth type of a fifth process value handled using a fifth tag name arbitrarily set by the user, a fifth upper limit value, a fifth lower limit value, and a fifth engineering unit of a n-th ("n" is an integer which is greater than or equal to 3) process value; and identifying second tag data as the n-th process value, wherein the second tag data is handled using the fifth tag name defined for the extracted fifth tag.

18. The non-transitory computer readable storage medium according to claim 15, wherein the one or more tag identification programs further comprise instructions for:

in a case where there is a plurality of process values to be identified, extracting, by the processor, the first tag the first tag name.

19. The non-transitory computer readable storage medium according to claim 18, wherein the one or more tag identification programs further comprise instructions for:

extracting, by the processor, the first tag by comparing first characters included in the first tag name with second characters included in another tag name.

20. The non-transitory computer readable storage medium according to claim 16, wherein the one or more tag identification programs further comprise instructions for:

in a case where the processor uses the second definition information, selecting the first tag data or extracting the third tag, by the processor, by tracing the graphics on the basis of a relationship between the graphics.

* * * * *